US009434417B2

(12) United States Patent
Imanishi et al.

(10) Patent No.: US 9,434,417 B2
(45) Date of Patent: Sep. 6, 2016

(54) VEHICLE SUBFRAME

(71) Applicants: HONDA MOTOR CO., LTD., Minato-Ku, Tokyo (JP); YANAGAWA SEIKI CO., LTD., Fuchu-Shi, Tokyo (JP)

(72) Inventors: Tomoyuki Imanishi, Wako (JP); Nobuyuki Okabe, Fuchu (JP)

(73) Assignees: Honda Motor Co., Ltd., Tokyo (JP); Yanagawa Seiki Co., Ltd., Tokyo (JP)

( * ) Notice: Subject to any disclaimer, the term of this patent is extended or adjusted under 35 U.S.C. 154(b) by 0 days.

(21) Appl. No.: 14/786,426

(22) PCT Filed: Apr. 25, 2014

(86) PCT No.: PCT/JP2014/061719
§ 371 (c)(1),
(2) Date: Oct. 22, 2015

(87) PCT Pub. No.: WO2014/175431
PCT Pub. Date: Oct. 30, 2014

(65) Prior Publication Data
US 2016/0090125 A1 Mar. 31, 2016

(30) Foreign Application Priority Data
Apr. 26, 2013 (JP) ................. 2013-093972

(51) Int. Cl.
*B62D 21/11* (2006.01)
*B22C 9/24* (2006.01)
*B22C 9/10* (2006.01)
*B22D 19/00* (2006.01)

(52) U.S. Cl.
CPC .............. *B62D 21/11* (2013.01); *B22C 9/10* (2013.01); *B22C 9/24* (2013.01); *B22D 19/00* (2013.01)

(58) Field of Classification Search
CPC ...................................... B62D 21/11
USPC ................................. 280/124.109
See application file for complete search history.

(56) References Cited

U.S. PATENT DOCUMENTS

| 6,547,281 B1 * | 4/2003 | Iwatsuki | ............... | B60G 11/16 280/781 |
| 7,976,037 B2 * | 7/2011 | Yoshida | ............... | B62D 21/11 280/124.109 |

(Continued)

FOREIGN PATENT DOCUMENTS

| JP | 2007-253642 A | 10/2007 |
| JP | 2012-061921 A | 3/2012 |

(Continued)

*Primary Examiner* — Ruth Ilan
(74) *Attorney, Agent, or Firm* — Carrier Blackman & Associates, P.C.; Joseph P. Carrier; William D. Blackman

(57) ABSTRACT

This vehicle subframe (15) includes a main body section (32) that results from a top section (41) and a bottom section (42) being provided with a predetermined gap in the vertical direction by means of being formed in a hollow shape by means of a core unit (80). A central joining section (38) is provided to the front-half section (32g) at the center (32h) in the vehicle widthwise direction of the main body section (32). Furthermore, in the main body section (32), a rear partition wall (64) is joined to the top section (41) and the bottom section (42) at the rearwards direction of the vehicle with respect to the central joining section (38). The rear partition wall (64) extends in the front-back direction of the vehicle.

2 Claims, 10 Drawing Sheets

(56) References Cited

U.S. PATENT DOCUMENTS

| | | | |
|---|---|---|---|
| 8,302,979 B2 | 11/2012 | Buschjohann et al. | |
| 8,579,307 B2 * | 11/2013 | Buschjohann | B22D 19/0072 280/124.109 |
| 8,740,231 B2 * | 6/2014 | Shibaya | B62D 21/00 280/124.109 |
| 9,150,250 B2 * | 10/2015 | Imanishi | B62D 21/11 |
| 9,216,775 B2 * | 12/2015 | Ohhama | B62D 21/11 |
| 2009/0051154 A1 * | 2/2009 | Eickmann | B60G 21/0551 280/788 |
| 2011/0215545 A1 * | 9/2011 | Buschjohann | B62D 21/11 280/124.109 |
| 2015/0076805 A1 * | 3/2015 | Imanishi | B22D 17/22 280/781 |
| 2015/0266511 A1 * | 9/2015 | Uicker | B23K 20/129 280/124.109 |
| 2016/0068189 A1 * | 3/2016 | Imanishi | B22C 9/10 296/204 |

FOREIGN PATENT DOCUMENTS

| | | | |
|---|---|---|---|
| JP | 2012-091693 A | 5/2012 | |
| WO | WO 2012059078 A2 * | 5/2012 | B62D 3/12 |

* cited by examiner

VEHICLE SUBFRAME

TECHNICAL FIELD

The present invention relates to a vehicular subframe disposed below a vehicular body for supporting a power plant used as a vehicular drive source, the subframe having left and right end portions supporting left and right suspensions, respectively.

BACKGROUND ART

Some known vehicles have cast subframes disposed on vehicle frames, and torque rods connected to widthwise centers of the subframes. The widthwise center is hereinafter referred to as "connecting portion" of the subframe. Through the torque rod connected to the subframe, the subframe supports a vehicular power plant.

The power plant is, for example, an engine/transmission unit, that is, an integrated engine and transmission.

The subframe has a hollow shape formed by a core placed in a cavity of a mold during casting. The subframe is light due to the hollow shape (see, e.g., patent literature 1 below)

For the subframe disclosed in patent literature 1, however, a relatively large load is applied from the torque rod to the connecting portion of the subframe because the connecting portion supports the power plant through the torque rod.

Thus, the connecting portion needs to be thick enough to obtain rigidity/strength, which makes it difficult to lighten the subframe.

PRIOR ART LITERATURE

Patent Literature

Patent Literature 1: JP-A-2012-91693

SUMMARY OF INVENTION

Technical Problem

An object of the present invention is to provide a vehicular subframe which is light but has rigidity/strength at a connecting portion thereof.

Solution to Problem

According to one aspect of the present invention, as defined in claim 1, there is provided a vehicular subframe integrally formed by casting using a core, the subframe comprising: a body portion having a top part and a bottom part, the body portion having a hollow space formed by the core to vertically space the top part and the bottom part from each other with a predetermined interval therebetween; left and right suspension support portions, the body portion having left and right end portions, the left and right suspension support portions being provided at the left and right end portions of the body portion, the suspension support portions being connected to suspension arms supporting suspensions; and a connecting portion provided at the body portion, the connecting portion being connected to a connecting member supporting a power plant used as a power source of a vehicle, wherein the body portion has a front part in a front-rear direction of the vehicle, and the connecting portion is provided at the front part of the body portion, and wherein the body portion includes a partition wall provided rearwardly of the connecting portion, the partition wall extending in the front-rear direction of the vehicle, the partition wall being connected to the top part and the bottom part.

Preferably, as defined in claim 2, the body portion includes a widthwise center located at a center of a width of the vehicle, and the partition wall is provided at the widthwise center of the body portion.

Advantageous Effects of Invention

Regarding the invention defined in claim 1, the connecting portion is provided at the front part of the body portion. The partition wall is provided rearwardly of the connecting portion. The partition wall is connected to the top and bottom parts of the body portion.

The partition wall, which is provided rearwardly of the connecting portion, connects the top and bottom parts of the body portion to each other. This ensures rigidity/strength of the subframe, particularly, rigidity/strength of the rear region behind the connecting portion.

As a result, the rear region bears a load applied through the connecting member to the connecting portion in the front-rear or vertical direction.

The rigidity/strength of the rear region is obtained just by the partition wall connected to the top part and bottom part. For this reason, the subframe is lighter than if the subframe has an increased thickness, particularly if the entire periphery of the connection portion has an increased thickness.

Regarding the invention defined in claim 2, the partition wall is provided at the widthwise center of the body portion.

The core used for forming the hollow part of the body portion has a bisected region corresponding to the widthwise center of the body portion. The partition wall is formed by molten material flowing between the core halves.

The mere bisection of the core ensures that the partition wall is easily formed between the core halves.

DESCRIPTION OF EMBODIMENT

A certain preferred embodiment of the present invention is described below with reference to the accompanying drawings. Throughout the specification and drawings, the terms "front or forward (Fr)", "rear (Rr)", "left (L)" and "right (R)" denote respective directions in which a driver views.

Embodiment

A subframe 15 in the Embodiment is discussed hereinabelow.

Figure 1:
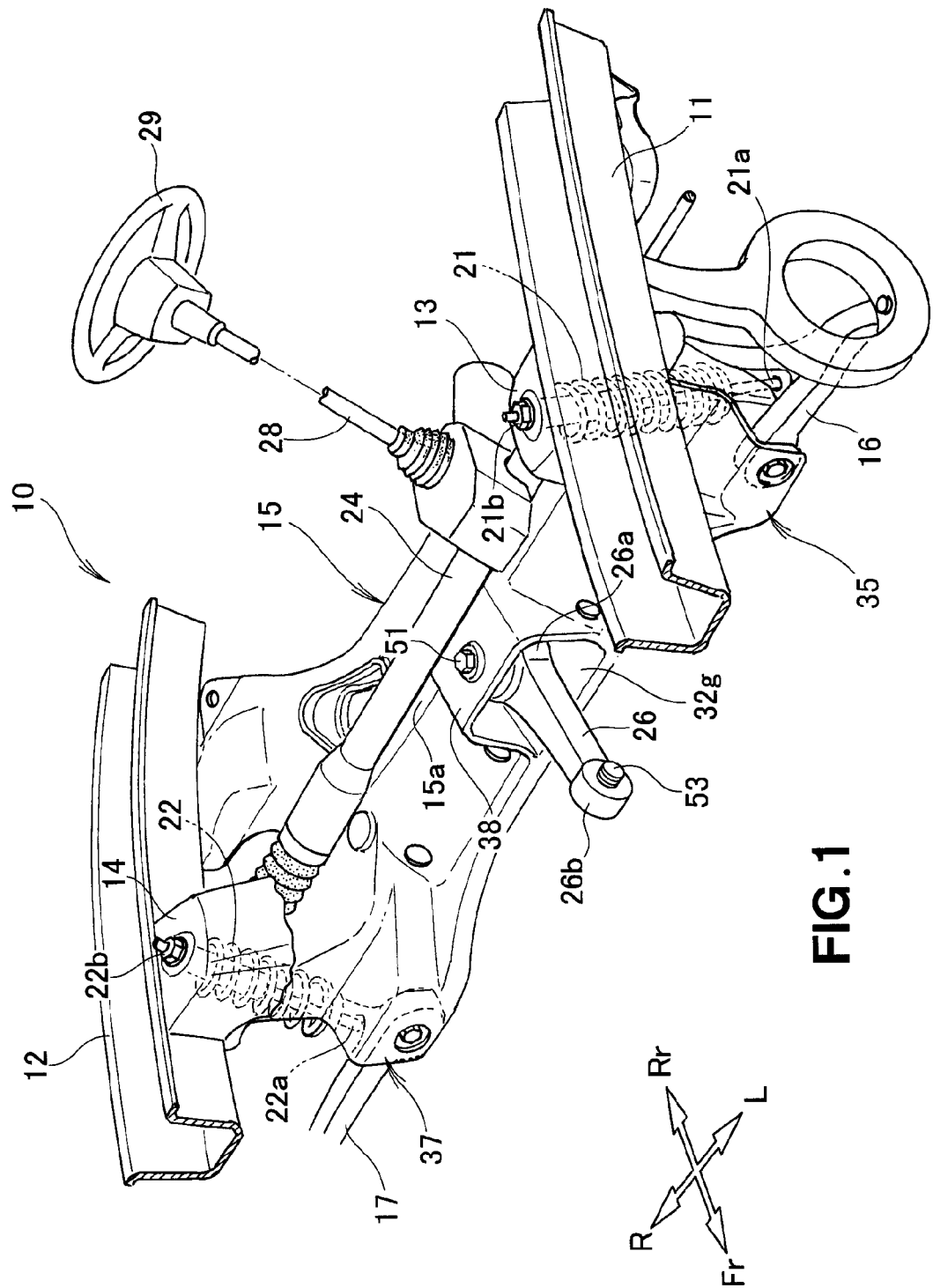
FIG. 1 is a perspective view of a vehicle body front structure including a subframe according to the present invention.
Figure 2:
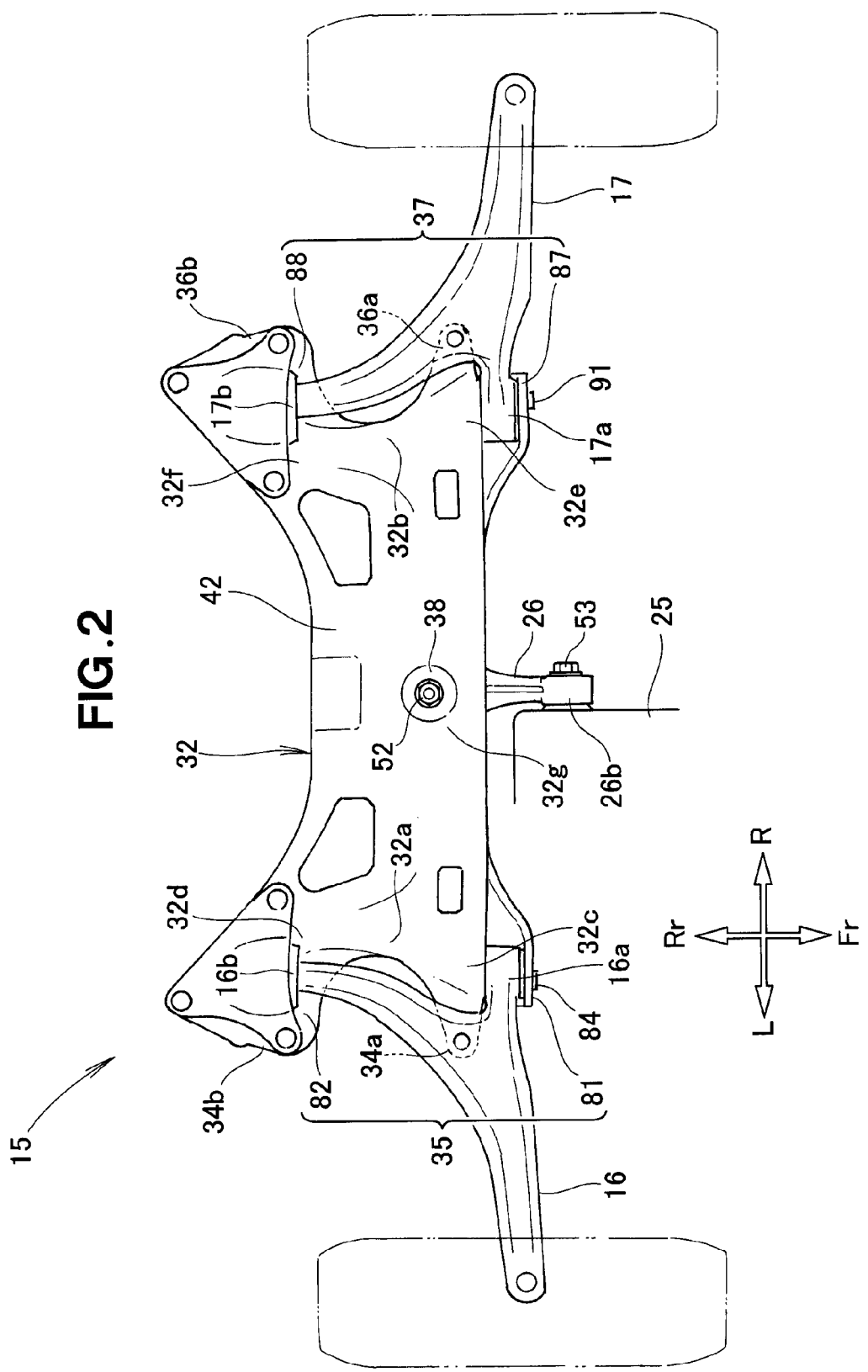
FIG. 2 is a plan view illustrating the subframe according to the present invention and suspension arms attached to the subframe.

As shown in FIGS. 1 and 2, a vehicle body front structure 10 includes left and right side frames 11, 12 extending in a front-rear direction of the vehicle body, the subframe 15 attached to bottoms of the left and right side frames 11, 12, left and right suspension arms 16, 17 disposed on left and right end portions of the subframe 15, and left and right suspensions 21, 22 connected to the left and right suspension arms 16, 17.

The vehicle body front structure 10 includes a steering gear box 24 attached to an upper part 15a of the subframe 15, and a torque rod (connecting member) 26 interconnecting the subframe 15 and a power plant 25.

A steering wheel 29 is attached to a steering shaft 28 extending from the steering gear box 24.

The power plant 25 is, e.g., an engine/transmission unit, that is, an integrated engine and transmission for use as a power source of the vehicle. The power plant is transversely disposed between the left and right side frames 11, 12.

Figure 3:
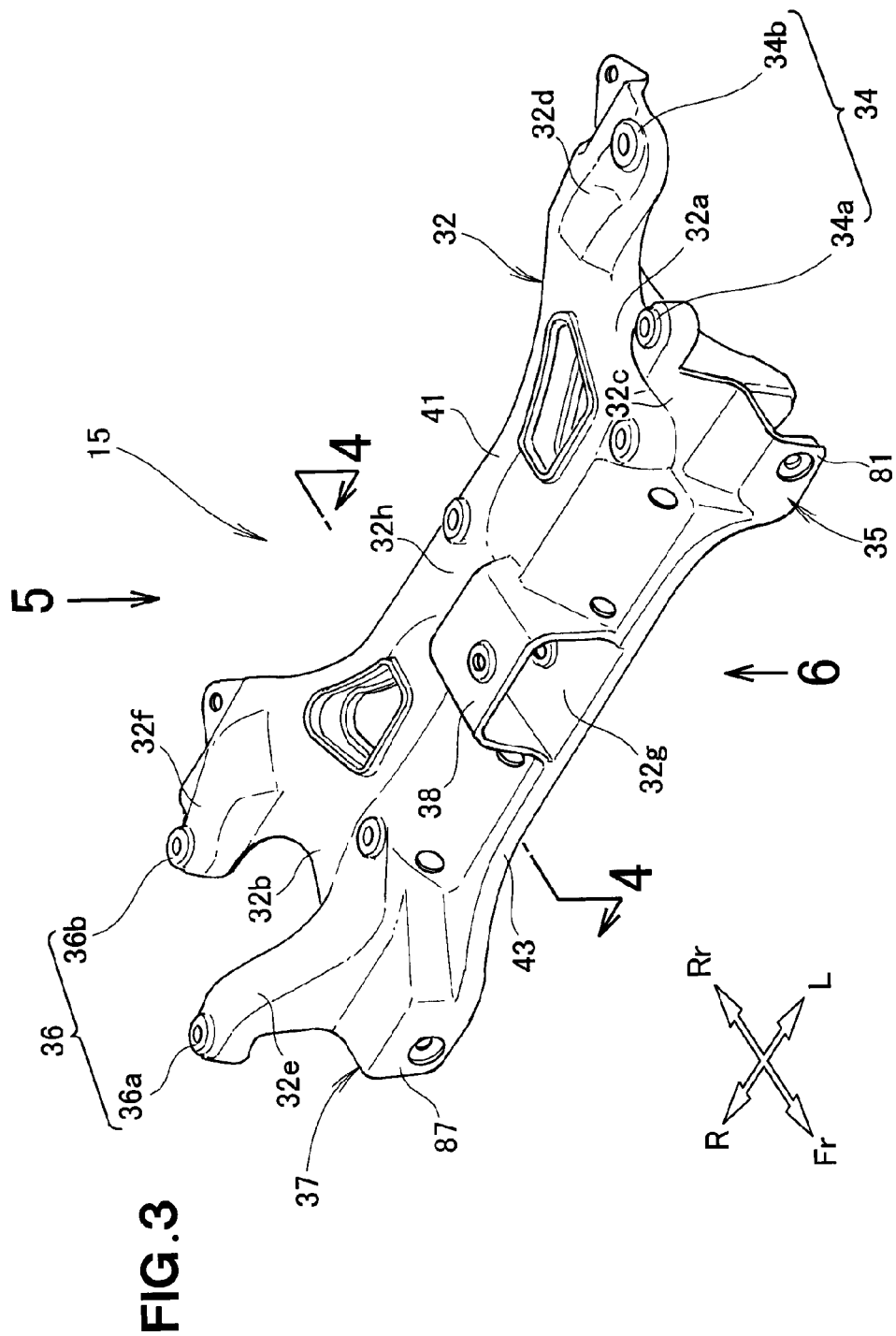
FIG. 3 is a perspective view of the subframe of FIG. 1.
Figure 4:
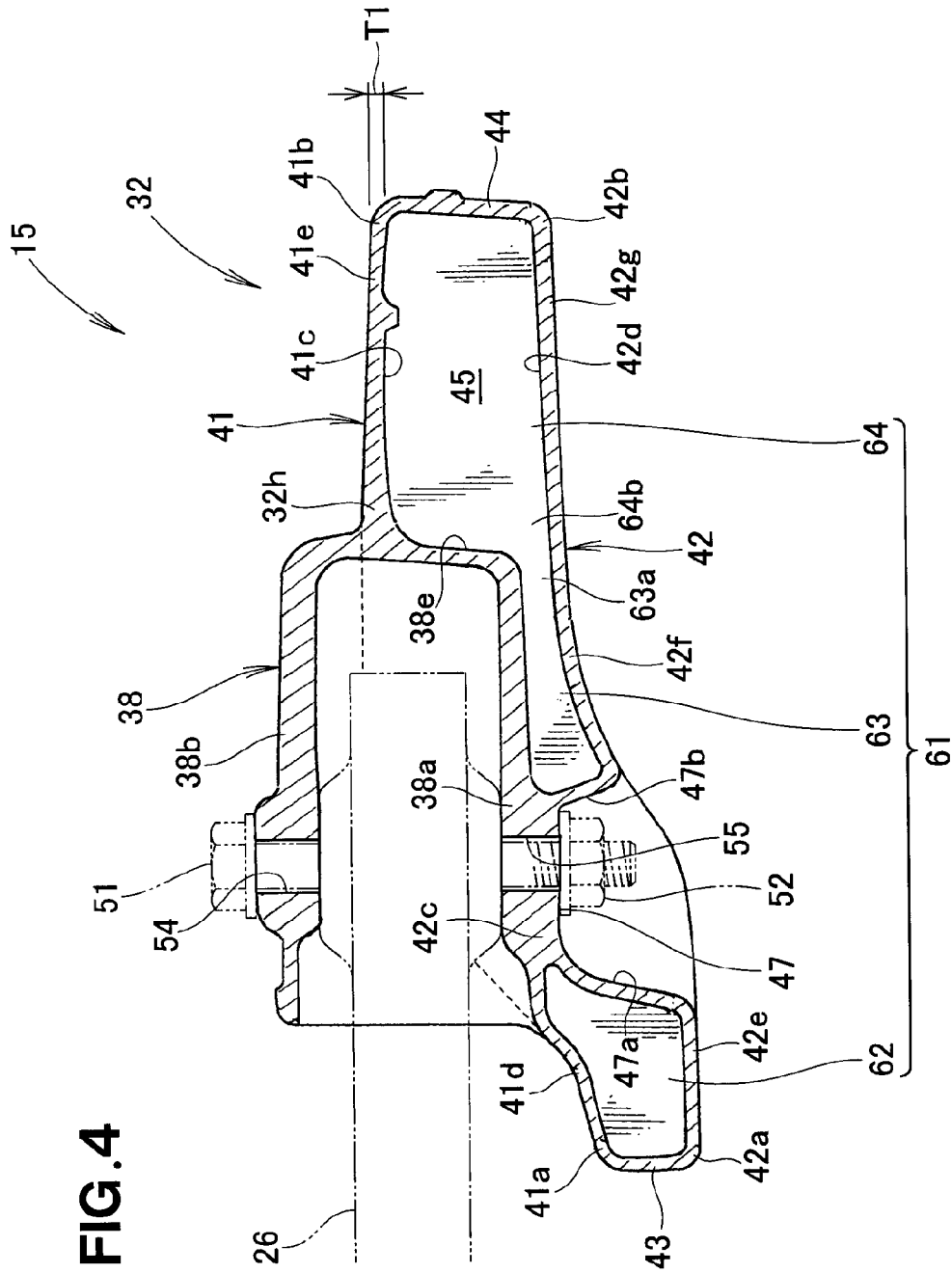
FIG. 4 is a cross-sectional view taken along line 4-4 of FIG. 3.
Figure 9:
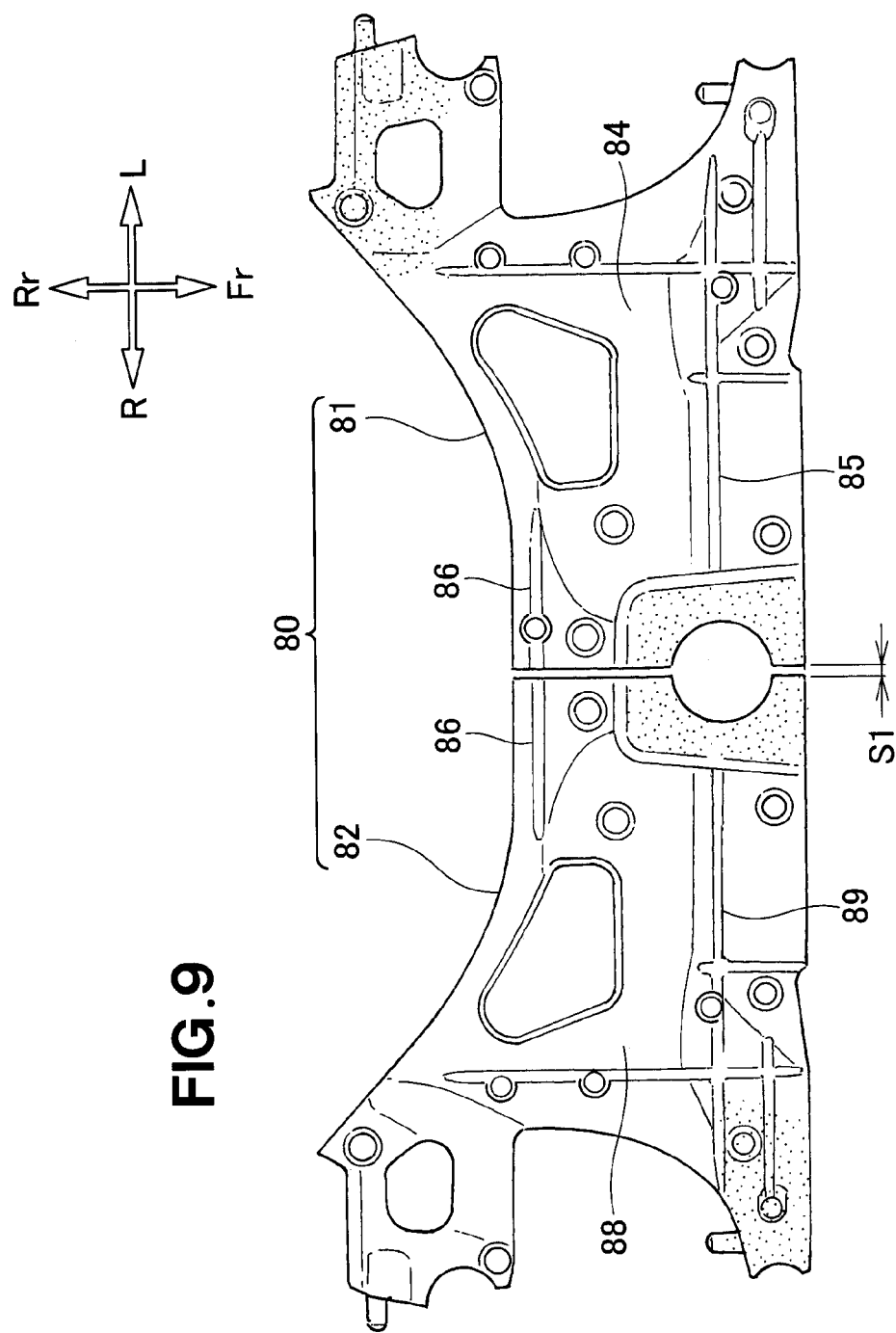
FIG. 9 is a plan view of a core unit according to the present invention.

As shown in FIGS. 3 and 4, the subframe 15 is an integral casting of a thickness T1 formed from aluminum alloy by high pressure casting using a core unit 80 (FIG. 9).

The subframe 15 includes a body portion 32 having a hollow space formed using the core unit 80. The subframe 15 also includes a left vehicle body attachment portion 34 and a left suspension support portion 35 both of which are provided at a left end portion 32a of the body portion 32. The subframe 15 also includes a right vehicle body attachment portion 36 and a right suspension support portion 37 both of which are provided at a right end portion 32b of the body portion 32. The subframe 15 further includes a central connecting portion 38 provided at a front central portion of the body portion 32.

The left vehicle body attachment portion 34 includes a left front attachment section 34a provided at a front part 32c of the left end portion 32a, and a left rear attachment section 34b provided at a rear part 32d of the left end portion 32a.

Like the left vehicle body attachment portion 34, the right vehicle body attachment portion 36 includes a right front attachment section 36a provided at a front part 32e of the right end portion 32b, and a right rear attachment section 36b provided at a rear part 32f of the right end portion 32b.

The left front attachment section 34a and the left rear attachment section 34b are attached to the left side frame 11 (FIG. 1) through bolts. The right front attachment section 36a and the right rear attachment section 36b are attached to the right side frame 12 (FIG. 1) through bolts.

That is, the subframe 15 is attached to the left and right side frames 11, 12.

Turning back to FIGS. 1 and 2, the left suspension support portion 35 includes a left front connecting section 81 provided at the front part 32c of the left end portion 32a, and a left rear connecting section 82 provided at the rear part 32d of the left end portion 32a.

The left front connecting section 81, which protrudes forward from the front part 32c, is located forwardly of the left front attachment section 34a.

The left rear connecting section 82, which is located more inside than the left rear attachment section 34b (FIG. 3) in a width direction of the vehicle, is interposed between the left rear attachment section 34b and the rear part 32d.

The left suspension arm 16 has a front attachment portion 16a connected to the left front connecting section 81 through a left front support pin 84. The left suspension arm 16 has a rear attachment portion 16b connected to the left rear connecting section 82 through a left rear support pin.

The left suspension 21 has a lower end portion 21a connected to the left suspension arm 16, and an upper end portion 21b connected to a left damper housing 13. The left damper housing 13 is formed integrally with the left side frame 11.

This ensures that the left suspension 21 is supported by the left suspension arm 16. More specifically, the left suspension 21 is supported via the left suspension arm 16 by the left suspension support portion 35.

Like the left suspension support portion 35, the right suspension support portion 37 includes a right front connecting section 87 provided at the front part 32e of the right end portion 32b, and a right rear connecting section 88 provided at the rear part 32f of the right end portion 32b.

The right front connecting section 87, which protrudes forward from the front part 32e, is located forwardly of the right front attachment section 36a.

The right rear connecting section 88, which is located more inside than the right rear attachment section 36b (FIG. 3) in the width direction of the vehicle, is interposed between the right rear attachment section 36b and the rear part 32f.

The right suspension arm 17 has a front attachment portion 17a connected to the right front connecting section 87 through a right front support pin 91. The right suspension arm 17 has a rear attachment portion 17b connected to the right rear connecting section 88 through a right rear support pin.

The right suspension arm 17 and the left suspension arm 16 are generally symmetrical to each other.

The right suspension 22 has a lower end portion 22a connected to the right suspension arm 17, and an upper end portion 22b connected to a right damper housing 14. The right damper housing 14 is formed integrally with the right side frame 11.

This ensures that the right suspension 22 is supported by the right suspension arm 17. More specifically, the right suspension 22 is supported via the right suspension arm 17 by the right suspension support portion 37.

As shown in FIGS. 2 and 3, the body portion 32 has a widthwise center 32h located at the center of the vehicular width, and a front half 32g (front part in the front-rear direction of the vehicle). The central connecting portion 38 is provided at the widthwise center 32h and the front half 32g.

The torque rod 26 has a proximal end portion 26a connected to the central connecting portion 38 by a bolt 51 (FIG. 1) and a nut 52. The torque rod 26 has a distal end portion 26b connected to the power plant 25 by a bolt 53. This ensures that the power plant 25 is supported by the torque rod 26.

As shown in FIGS. 3 and 4, the body portion 32 has an upwardly facing top part 41, a downwardly facing bottom part 42, a front wall 43 and a rear wall 44. The front wall 43 interconnects respective front end portions 41a, 42a of the top and bottom parts 41, 42. The rear wall 44 interconnects respective rear end portions 41b, 42b of the top and bottom parts 41, 42. The body portion 32 has a hollow part 45 defined by the top part 41, bottom part 41, front wall 43 and rear wall 44.

The hollow part 45 is formed by the core unit 80 (FIG. 9) during the casting of the subframe 15.

The top part 41 and the bottom part 42 are vertically spaced from each other by a predetermined interval.

The central connecting portion 38 is formed integrally with the front half 32g at a widthwise center of the top part 41.

The bottom part 42 has a front portion 42c defining a bottom part 38a of the central connecting portion 38. Formed integrally with the front portion 42c is a connecting recessed portion 47 at a widthwise center of the bottom part 42.

The central connecting portion 38 has an upper attachment hole 54 formed through a top part 38b thereof. The bottom part 38a of the central connecting portion 38, which includes the front portion 42c of the bottom part 42, has a lower attachment hole 55 formed therethrough. The bolt 51, which is inserted through the upper attachment hole 54 and the lower attachment hole 55, is connected to the torque rod 26.

Figure 5:
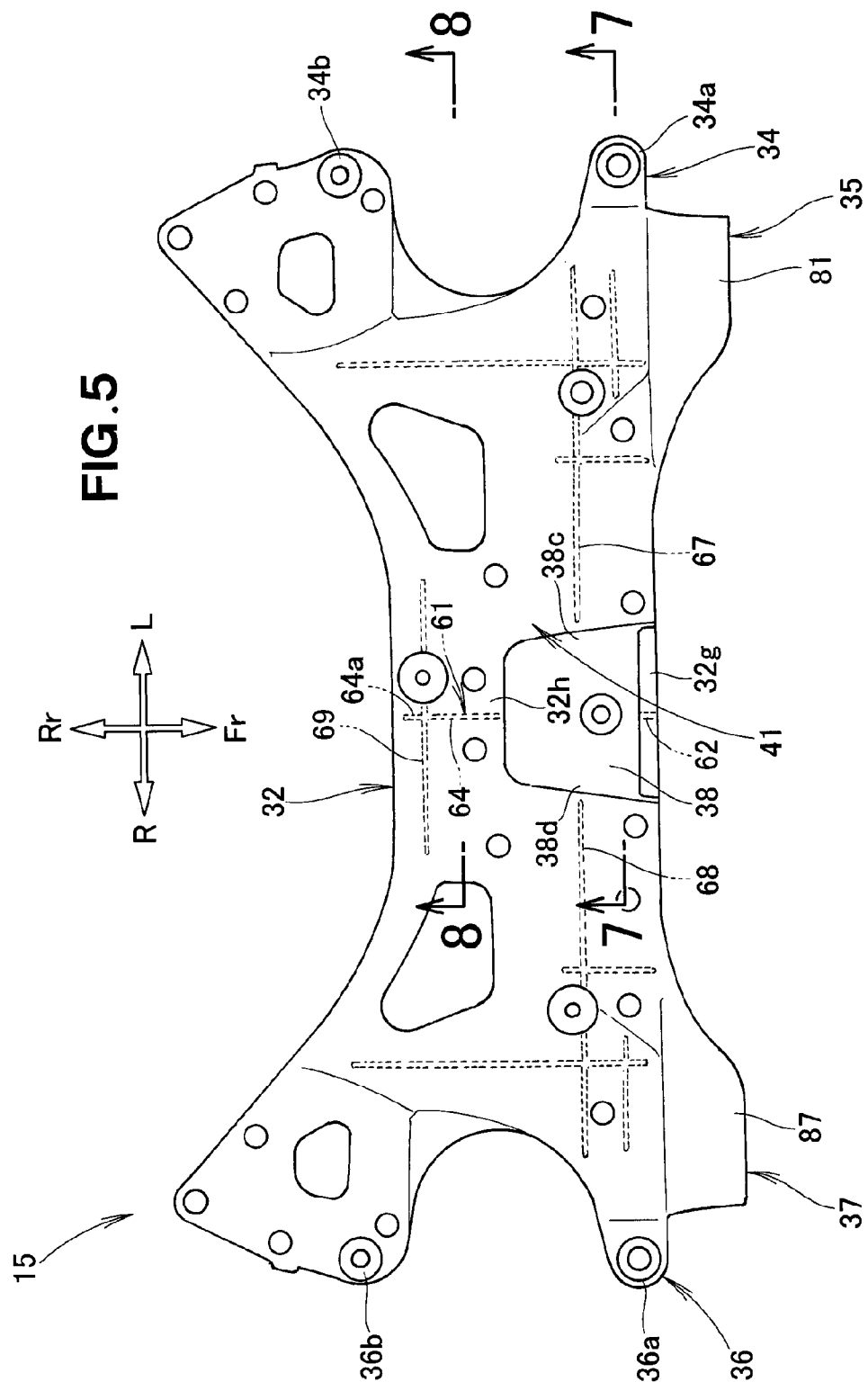
FIG. 5 is a view taken in a direction of an arrow 5 of FIG. 3.
Figure 6:
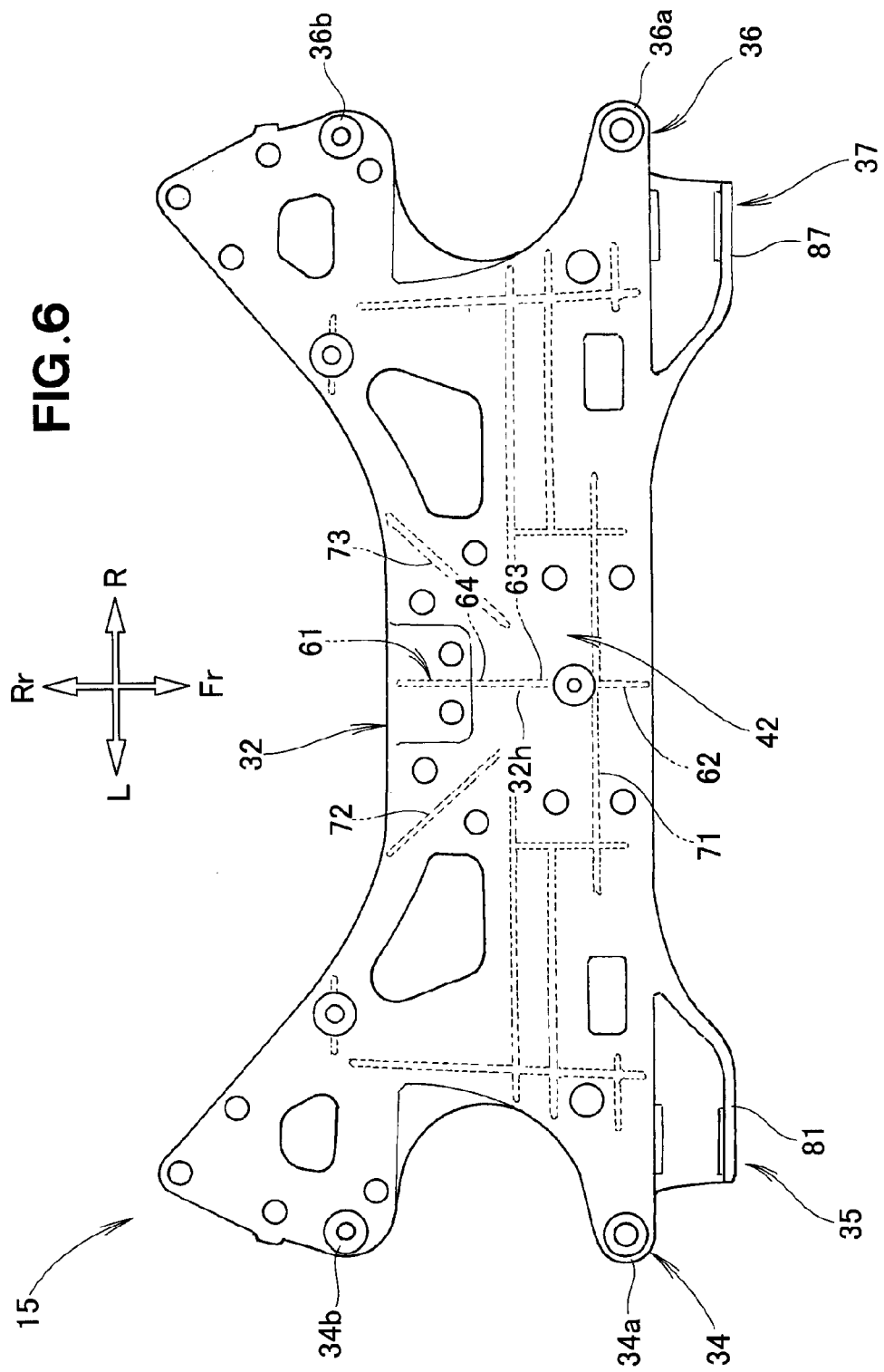
FIG. 6 is a view taken in a direction of an arrow 6 of FIG. 3.

As shown in FIGS. 5 and 6, the body portion 32 includes a partition wall 61 provided at the widthwise center 32h. The partition wall 61 has a front partition wall portion 62 provided forwardly of the central connecting portion 38, a central partition wall portion 63 provided at the bottom part of the central connecting portion 38, and a rear partition wall portion (partition wall) 64 provided rearwardly of the central connecting portion 38.

The partition wall 61 is discussed later in detail.

The body portion 32 includes left and right, upper front lateral ribs 67, 68 and an upper rear central lateral rib 69. These ribs 67, 68, 69, which are disposed on an inner surface 41c (FIG. 4) of the top part 41, reinforce the subframe 15.

The left upper front lateral rib 67 extends outwardly from a left end part 38c of the central connecting portion 38 in the width direction of the vehicle, and protrudes from the inner surface 41c toward the hollow part 45 (FIG. 4).

The right upper front lateral rib 68 is symmetrical to the left upper front lateral rib 67. The rib 68 extends outwardly from a right end part 38d of the central connecting portion 38 in the width direction of the vehicle, and protrudes from the inner surface 41c toward the hollow part 45.

The upper rear central lateral rib 69 extends outwardly from a rear end part 64a of the rear partition wall portion 64 in opposite, i.e., left and right directions. In short, the rib 69 extends outwardly from the rear end part 64a in the width direction of the vehicle. The rib 69 protrudes from the inner surface 41c toward the hollow part 45 (FIG. 4).

The left and right upper front lateral ribs 67, 68 and the upper rear central lateral rib 69, all of which are provided on the inner surface 41c of the top part 41, reinforce the top part 41 (i.e., the subframe 15).

The body portion 32 further a lower front central lateral rib 71 and left and right, rear inclining ribs 72, 73. The ribs 71, 72, 73, which are provided on an inner surface 42d (FIG. 4) of the bottom part 42, reinforce the subframe 15.

The lower front central lateral rib 71 extends outwardly from the front partition wall portion 62 in the opposite, i.e., left and right directions. In short, the rib 71 extends outwardly from the front partition wall portion 62 in the width direction of the vehicle. The rib 71 protrudes from the inner surface 42d toward the hollow part 45 (FIG. 4).

The left rear inclining rib 72 extends away from a left vicinity of the rear partition wall portion 64 in an outward and rearward direction of the vehicle. The rib 72 protrudes from the inner surface 42d toward the hollow part 45.

The right rear inclining rib 73 is symmetric to the left rear inclining rib 72. The rib 73 extends away from a right vicinity of the rear partition wall portion 64 in the outward and rearward direction of the vehicle. The rib 73 protrudes from the inner surface 42d toward the hollow part 45.

The lower front central lateral rib 71 and the left and right rear inclining ribs 72, 73, all of which are provided on the inner surface 42d of the bottom part 42, reinforce the bottom part 42 (i.e., the subframe 15).

The partition wall 61 is discussed in detain below.

Referring back to FIG. 4, the partition wall 61 is provided at the widthwise center 32h of the body portion 32 (see also FIG. 5). The partition wall 61 is defined by the front partition wall portion 62 provided forwardly of the central connecting portion 38, the central partition wall portion 63 provided at the bottom part of the central connecting portion 38, and the rear partition wall portion 64 provided rearwardly of the central connecting portion 38.

More specifically, the front partition wall portion 62, which is located at the widthwise center 32h of the body portion 32, is provided forwardly of and below the central connecting portion 38.

This front partition wall portion 62, which extends in the front-rear direction of the vehicle, is connected to a front portion 41d of the top part 41, the front wall 43, a frontal portion 42e of the bottom part 42 and a front part 47a of the connecting recessed portion 47.

Figure 7:
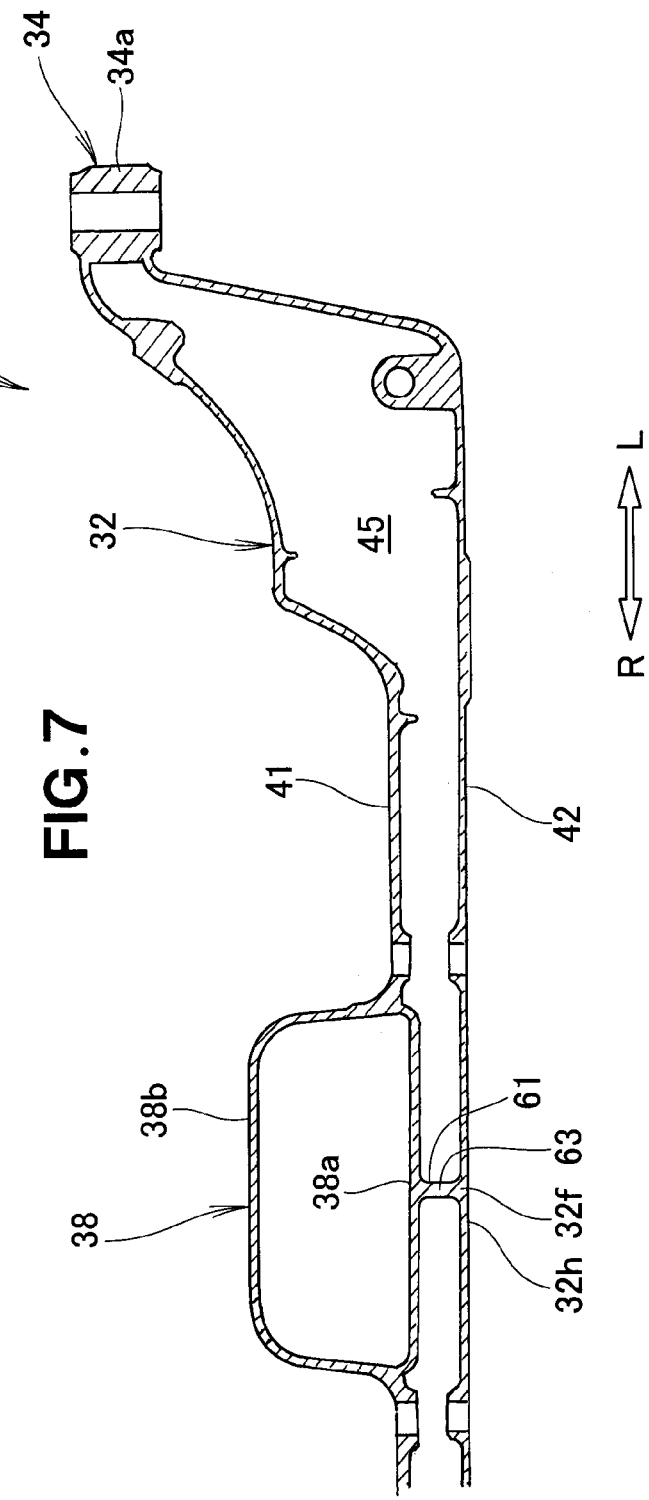
FIG. 7 is a cross-sectional view taken along line 7-7 of FIG. 5.

As shown in FIGS. 4 and 7, the central partition wall portion 63, which is located at the widthwise center 32h of the body portion 32, is provided at the bottom part 38a of the central connecting portion 38. In short, the central partition wall portion 63 is disposed below the central connecting portion 38.

This central partition wall portion 63 extends in the front-rear direction of the vehicle on an extended line of the front partition wall portion 62. The central partition wall portion 63 is connected to the bottom part 38a of the central connecting portion 38, a rear part 47b of the connecting recessed portion 47, and a central portion 42f of the bottom part 42.

Figure 8:
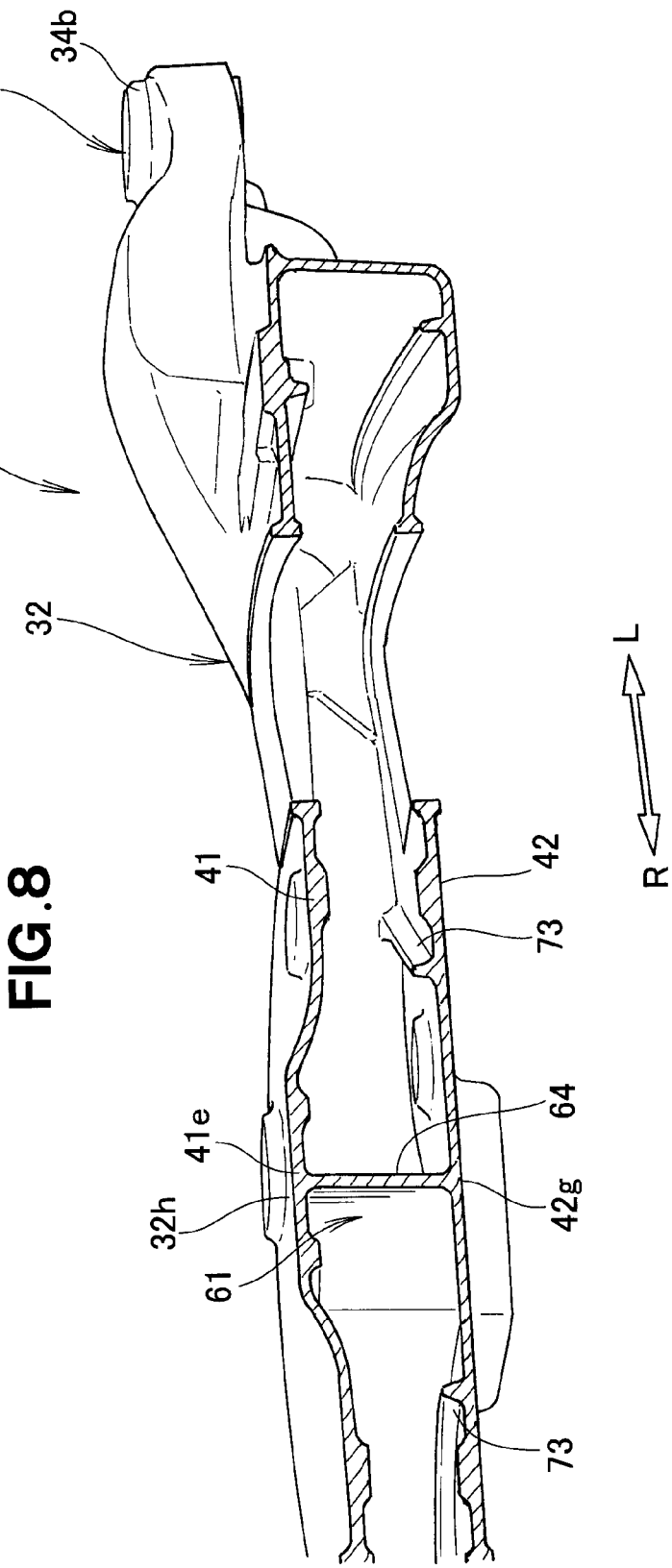
FIG. 8 is a cross-sectional view taken along line 8-8 of FIG. 5.

As shown in FIGS. 4 and 8, the rear partition wall portion 64, which is located at the widthwise center 32h of the body portion 32, is provided rearwardly of the central connecting portion 38.

This rear partition wall portion 64 extends in the front-rear direction of the vehicle on an extended line of the central partition wall portion 63. The rear partition wall portion 64 is connected to a rear portion 41e of the top part 41, a rear part 38e of the central connecting portion 38, a rear portion 42g of the bottom part 42, and the rear wall 44.

The rear partition wall portion 64 has a front end part 64b integral with a rear end part 63a of the central partition wall portion 63.

This ensures that the top part 41, bottom part 42, front wall 43 and rear wall 44 of the body portion 32 are connected to one another by the partition wall 61 (i.e., the front partition wall portion 62, the central partition wall portion 63 and the rear partition wall portion 64).

The subframe 15 is formed by casting with the core unit 80 (FIG. 9) placed in a mold.

As shown in FIG. 9, the core unit 90 is defined by left and right, sand-made core members 81, 82 separated from each other. The core members 81, 82 correspond to the widthwise center 32h of the subframe 15 (FIG. 3).

When the core unit 80 is placed in the mold, the left core member 81 and the right core member 82 define an interval S1 therebetween.

During casting of the subframe 15, the interval S1 between the left core member 81 and the right core member 82 is filled with molten aluminum to form the partition wall 61 (the front partition wall portion 62, the central partition wall portion 63 and the rear partition wall portion 64 (FIG. 4)).

The simple structure, the core unit 80 bisected into the left and right core units 81, 82 with the gap S1 therebetween, forms the partition wall 61 with ease. This means that the cost of the subframe 15 (FIG. 3) is kept low with the partition wall 61 formed in this manner.

Provided at a top portion 84 of the left core member 81 are a left upper front lateral groove 85 and a left half of an upper rear lateral groove 86. The left upper front lateral groove 85 and the left half of the channel 86 form the left upper front lateral rib 67 and a left half of the upper rear central lateral rib 69, on a left half of the subframe 15 (top part 41) shown in FIG. 5.

At a bottom portion of the left core member 81 are provided a left half of a lower rear central lateral groove and a left rear inclining groove. The left half of the lower rear central lateral groove and the left rear inclining groove form a left half of the lower front central lateral rib 71 and the left rear inclining rib 72, on the left half of the subframe 15 (bottom part 42) shown in FIG. 6.

The right core member 82 is generally symmetric to the left core member 81. A right upper front lateral groove 89 and a right half of an upper rear lateral groove 86 are formed on a top portion 88 of the right core member 82. The groove 89 and the right half of the groove 86 form the right upper front lateral rib 68 and a right half of the upper rear central lateral rib 69, on a right half of the subframe 15 (top part 41) shown in FIG. 5.

Provided at a bottom portion of the right core member 82 are a right half of the lower rear central lateral groove and a right rear inclining groove. The right half of the lower rear central lateral groove and the right rear inclining groove form a right half of the lower front central lateral rib 71 and the right rear inclining rib 73, on a right half of the subframe 15 (bottom part 42) shown in FIG. 6.

Next, an example of how to bear a load applied to the central connecting portion 38 of the subframe 15 is discussed with reference to FIG. 10.

Figure 10:
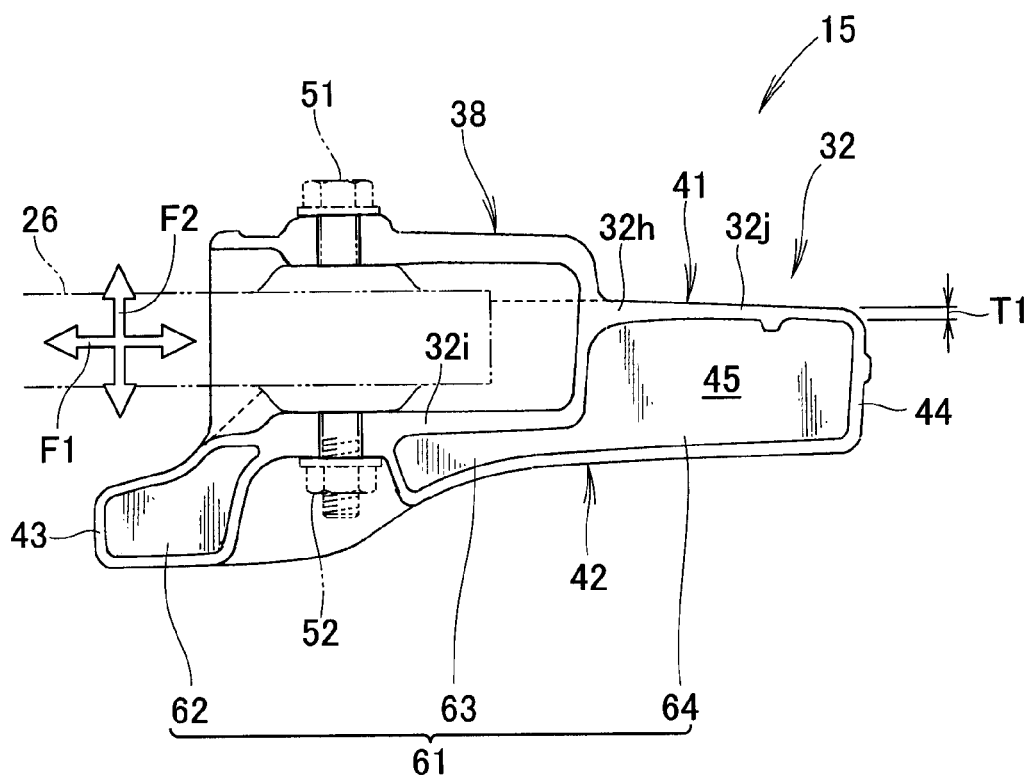
FIG. 10 is a view illustrating an example of how to bear a load applied to a central connecting portion of the subframe according to the present invention.

As shown in FIG. 10, the front partition wall portion 62 is provided below and forwardly of the central connecting portion 38, the central partition wall portion 63 provided below the central connecting portion 38, and the rear partition wall portion 64 disposed rearwardly of the central connecting portion 38. That is, the partition wall 61 is provided at the widthwise center 32h of the body portion 32.

The top part 41, bottom part 42, front wall 43 and rear wall 44 are connected to one another by the partition wall 61.

This ensures rigidity/strength of the subframe 15 (more specifically, a lower region 32i of the central connecting portion 38 and a rear region 32j of the central connecting portion 38). For this reason, the lower region 32i and/or the rear region 32j bears a load F1 applied through the torque rod 26 to the central connecting portion 38 in the front-rear direction of the vehicle.

In addition, the lower region 32i and/or the rear region 32j bears a vertical load F2 applied through the torque rod 26 to the central connecting portion 38.

The lower region 32i and/or the rear region 32j bears a load other than the loads F1, F2 applied to the central connecting portion 38 through the torque rod 26.

Since the lower region 32i and/or the rear region 32j bears the load F1 or F2 or other loads, the subframe 15 well bears vibration transmitted thereto via the torque rod 26 from the power plant 25 (FIG. 2).

The rigidity/strength of the subframe 15 (more specifically, the lower region 32i, the rear region 32j) is obtained just by the partition wall 61 connecting the top part 41, bottom part 42, front wall 43 and rear wall 44 of the body portion 32 to one another.

For that reason, the subframe 15 is lighter than if the subframe 15 has a thickness T1 greater than that discussed above, particularly if the entire periphery of the connection portion has a thickness greater than that discussed above.

It is understood that the vehicular subframe according to the present invention may be changed or improved where appropriate rather than being limited to the subframe discussed in the Embodiment.

For example, metal other than aluminum alloy may be used for the subframe although the subframe is made of aluminum alloy in the Embodiment.

While the subframe 15 is formed by casting aluminum alloy under high pressure in the Embodiment, other methods may be used.

Further, the central connecting portion 38 and the partition wall 61 may be provided at other regions than the body portion 32 although the central connecting portion 38 is provided at the front central portion of the body portion 32 and the partition wall 61 is provided at the widthwise center 32h of the body portion 32 in the Embodiment.

It is also understood that the subframe, the left and right suspension arms, the left and right suspensions, the power plant, the torque rod, the body portion, the left and right suspension support portions, the central connecting portion, the top part, the bottom part, the partition wall, and the rear partition wall portion are not limited to those discussed in the Embodiment, but may be changed to have other shapes or structures than those discussed in the Embodiment, where appropriate.

INDUSTRIAL APPLICABILITY

The present invention is preferably applied to an automobile including a subframe disposed below the automotive body, the subframe having left and right end portions supporting left and right suspensions, respectively.

REFERENCE SIGNS LIST

10 . . . a vehicle body front structure, 15 . . . a subframe, 21, 22 . . . left and right suspensions, 25 . . . a power plant, 26 . . . a torque rod (connecting member), 32 . . . a body portion, 32a . . . a left end portion of the body portion, 32b . . . a right end portion of the body portion, 32g . . . a front half (front part in a front-rear direction of a vehicle), 32h . . . a widthwise center of the body portion, 35, 37 . . . left and right suspension support portions, 38 . . . a central connecting portion (connecting portion), 41 . . . a top part, 42 . . . a bottom part, 61 . . . a partition wall, 64 . . . a rear partition wall portion, 80 . . . a core unit (core)

The invention claimed is:

1. A vehicular subframe integrally formed by casting using a core, the subframe comprising:
   a body portion having a top part and a bottom part, the body portion having a hollow space formed by the core to vertically space the top part and the bottom part from each other with a predetermined interval therebetween;

left and right suspension support portions, the body portion having left and right end portions, the left and right suspension support portions being provided at the left and right end portions of the body portion, the suspension support portions being connected to suspension arms supporting suspensions; and a connecting portion provided at the body portion, the connecting portion being connected to a connecting member supporting a power plant used as a power source of a vehicle, wherein the body portion has a front part in a front-rear direction of the vehicle, and the connecting portion is provided at the front part of the body portion, and wherein the body portion includes a partition wall provided rearwardly of the connecting portion, the partition wall extending in the front-rear direction of the vehicle, the partition wall being connected to the top part and the bottom part.

2. The device of claim 1, wherein the body portion includes a widthwise center located at a center of a width of the vehicle, and the partition wall is provided at the widthwise center of the body portion.

* * * * *